US009882214B2

United States Patent
Lee et al.

(10) Patent No.: US 9,882,214 B2
(45) Date of Patent: Jan. 30, 2018

(54) LITHIUM METAL OXIDE CATHODE MATERIALS AND METHOD TO MAKE THEM

(71) Applicant: Dow Global Technologies LLC, Midland, MI (US)

(72) Inventors: Edward L. Lee, Willowbrook, IL (US); Fu Zhou, Midland, MI (US)

(73) Assignee: Dow Global Technologies LLC, Midland, MI (US)

(*) Notice: Subject to any disclaimer, the term of this patent is extended or adjusted under 35 U.S.C. 154(b) by 68 days.

(21) Appl. No.: 15/028,081

(22) PCT Filed: Oct. 16, 2014

(86) PCT No.: PCT/US2014/060835
§ 371 (c)(1),
(2) Date: Apr. 8, 2016

(87) PCT Pub. No.: WO2015/061121
PCT Pub. Date: Apr. 30, 2015

(65) Prior Publication Data
US 2016/0254540 A1    Sep. 1, 2016

Related U.S. Application Data

(60) Provisional application No. 61/895,094, filed on Oct. 24, 2013.

(51) Int. Cl.
*H01B 1/08* (2006.01)
*H01M 4/505* (2010.01)
(Continued)

(52) U.S. Cl.
CPC .......... *H01M 4/505* (2013.01); *C01G 53/006* (2013.01); *C01G 53/44* (2013.01); *C01G 53/50* (2013.01);
(Continued)

(58) Field of Classification Search
CPC ...... C01G 53/006; C01G 53/44; C01G 53/50; C01P 2002/50; C01P 2002/54;
(Continued)

(56) References Cited

U.S. PATENT DOCUMENTS 5,393,622 A    2/1995 Nitta et al.
5,858,324 A    1/1999 Dahn et al.
(Continued)

FOREIGN PATENT DOCUMENTS

EP    918041 A1    5/1999
EP    944125 A1    9/1999
(Continued)

OTHER PUBLICATIONS

Database WPI, Section Ch, Week 201244, XP002734423.
(Continued)

*Primary Examiner* — Mark Kopec
*Assistant Examiner* — Jaison P Thomas

(57) ABSTRACT

An improved method of forming a precipitated transition metal salt useful to make a lithium transition metal oxide useful for making a lithium ion battery comprises the following. A transition metal solution comprised of a dissolved transition metal salt in water and an alkali solution comprised of an alkali salt dissolved in water are introduced into a reactor having an inlet and an outlet connected by a tubular member having therein packing. The rate in which said solutions are introduced are such that the pH of the overall solution in the reactor has pH of 5 to 12 and the time of reaction (mere seconds to several minutes) in the reactor is sufficient to form a precipitated transition metal salt in an effluent liquid. The transition metal salt precipitate in the effluent is discharged from the reactor and the salt separated from the effluent, where it can be purified by washing and dried and subsequently heated with a lithium compound to
(Continued)

form a lithium metal oxide useful for making lithium ion batteries.

17 Claims, 6 Drawing Sheets

(51) Int. Cl.
*C01G 53/00* (2006.01)
*H01M 4/525* (2010.01)
*H01M 4/485* (2010.01)

(52) U.S. Cl.
CPC ............ *H01B 1/08* (2013.01); *H01M 4/485* (2013.01); *H01M 4/525* (2013.01); *C01P 2002/50* (2013.01); *C01P 2002/54* (2013.01); *C01P 2004/03* (2013.01); *C01P 2004/32* (2013.01); *C01P 2004/61* (2013.01); *C01P 2006/11* (2013.01); *C01P 2006/40* (2013.01)

(58) Field of Classification Search
CPC ............ C01P 2004/03; C01P 2004/32; C01P 2004/61; C01P 2006/11; C01P 2006/40; H01M 4/485; H01M 4/505; H01M 4/525; H01B 1/08

See application file for complete search history.

(56) References Cited

U.S. PATENT DOCUMENTS

| | | |
|---|---|---|
| 6,168,887 B1 | 1/2001 | Dahn et al. |
| 6,368,749 B1 | 4/2002 | Yanai et al. |
| 6,660,432 B2 | 12/2003 | Paulsen et al. |
| 6,677,082 B2 | 1/2004 | Thackeray et al. |
| 6,964,828 B2 | 11/2005 | Lu et al. |
| 7,205,072 B2 | 4/2007 | Kang et al. |
| 7,435,402 B2 | 10/2008 | Kang et al. |
| 7,482,382 B2 | 1/2009 | Li et al. |
| 2006/0083989 A1 | 4/2006 | Suhara et al. |
| 2010/0059707 A1* | 3/2010 | Albrecht ............ C01G 53/006 252/182.1 |
| 2011/0291044 A1 | 12/2011 | Wang et al. |
| 2012/0080649 A1 | 4/2012 | Koenig, Jr. et al. |

FOREIGN PATENT DOCUMENTS

| | | |
|---|---|---|
| EP | 813256 B1 | 5/2002 |
| EP | 1295851 A1 | 3/2003 |
| EP | 1296391 A1 | 3/2003 |
| EP | 1193782 B1 | 5/2007 |
| EP | 2492243 A1 | 8/2012 |
| JP | 8037007 A | 2/1996 |
| JP | 11307094 A | 11/1999 |
| JP | 2012136421 A * | 7/2012 ............ B82Y 30/00 |
| JP | 2012136421 A | 7/2012 |

OTHER PUBLICATIONS

Wang, D., Belharouak, I., Koenig, G.M., Zhou, G., Amine, K., "Growth mechanism of $Ni_{0.3}Mn_{0.7}CO_3$ precursor for high capacity Li-ion battery cathodes", J. Mater. Chem., 2011, 21, 9290.

Lee, D.-K., Park, S.-H., Amine, K., Bang, H.J., Parakash, J., Sun, Y.-K., "High capacity $Li[Li_{0.2}Ni_{0.2}Mn_{0.6}]O_2$ cathode materials via acarbonate co-precipitation method" J. Power Sources, 162 (2006) 1346.

Park, S.-H., Kang, S.-H., Belharouak, I., Sun, Y.-K., Amine, K., "Physical and electrochemical properties of spherical$Li_{1+x}(Ni_{1/3}Co_{1/3}Mn_{1/3})_{1-x}O_2$ cathode materials" J. Power Sources, 177 (2008) 177.

Lim, J.-H., Bang, H., Lee, K.-S., Amine, K., Sun, Y.-K., "Electrochemical characterization of $Li_2MnO_3$—Li $[Ni_{1/3}Co_{1/3}Mn_{1/3}]O_2$—$LiNiO_2$cathode synthesized via co-precipitation for lithium secondary batteries" J. Power Sources, 189 (2009) 571.

Van Bommel, A., Dahn, J.R., "Analysis of the Growth Mechanism of Co-precipitated Spherical and Dense Nickel, Manganese, and Cobalt-Containing Hydroxides in the Presence of Aqueous Ammonia", Chem. Mater. 2009, 21, 1500.

* cited by examiner

LITHIUM METAL OXIDE CATHODE MATERIALS AND METHOD TO MAKE THEM

FIELD OF THE INVENTION

The invention relates to an improved method of making lithium metal oxide precursors and lithium metal oxides made from them for use in lithium ion batteries (LIBs). In particular, the invention relates to a method utilizing plug flow conditions for the continuous production of lithium metal oxide precursors.

BACKGROUND OF THE INVENTION

Lithium ion batteries have, over the past couple of decades, been used in portable electronic equipment and more recently in hybrid and electric vehicles. Initially, lithium ion batteries first employed lithium cobalt oxide cathodes. Due to expense, toxicological issues and limited energy capacity, other cathode materials have, or are being developed.

Other lithium metal oxides (LMOs) have been or are being developed comprising Ni or Mn. Desirable lithium metal oxides that have been developed generally are complex metal oxides that contain a combination of Ni, Mn and Co. These also may contain dopants or coatings that improve one or more properties such as cycle life. The lithium metal oxide may be stoichiometric or essentially stoichiometric such as those described by U.S. Pat. Nos. 6,964,828; 6,168,887; 5,858,324; 6,368,749; 5,393,622 and European Pat. Publ. Nos. EP1295851, EP0918041, and EP0944125 and Japanese Patent Disclosure No. 11-307094. Likewise, the lithium metal oxide may be made with an excess of lithium such as those described by U.S. Pat. Nos. 6,660,432 and 6,677,082 and Japanese Appl. No. H8-37007.

These lithium metal oxides have been made by solid state synthesis where particulate precursors are mixed or milled and then heated to a temperature to form the LMO. Examples of this method are described in U.S. Pat. No. 6,368,749 and EP0944125, EP1296391 and EP1193782. The lithium metal oxides have also been formed by first precipitating a complex precursor in continuously stirred reactors with the complex precursor compound subsequently heated with a lithium compound to a temperature to form the LMO. Examples of these methods are described by U.S. Pat. No. 6,964,828 and Japanese Patent Disclosure No. 11-307094. Other methods have also been described such as hydrothermal methods and sol gel methods to form the complex oxides. Examples of these are described in U.S. Pat. No. 7,482,382 and EP0813256.

Generally, LMOs have tended to be made from complex metal compounds, "LMO precursors," precipitated from a continuously stirred reactor that are then mixed with lithium containing compounds and heated sufficiently to form the LMOs. They have generally been made this way to avoid the problems encountered with simple mixing or milling of precursors such as non-uniformity of the chemistry, primary grain/particle size and secondary particle size. Unfortunately, continuous stirred reactors require long reaction residence times to achieve desired secondary particle size, varying reaction conditions that preclude them from being used continuously (e.g., secondary particle size growth over time) and large capital investment due to large tanks necessary to make the LMOs on a production scale.

Accordingly, it would be desirable to provide an improved method to make LMOs that avoids one or more problems of the prior art. In particular, it would be desirable to provide a method that allows for continuous or semi-continuous operation, short residence times, small capital cost and ease of controlling secondary particle size and distribution as well as desired primary particle/grain size.

SUMMARY OF THE INVENTION

Applicants have discovered that lithium metal oxide precursors (transition metal salts) useful for making lithium metal oxides which can be used to make lithium ion batteries (LIBs) may be made more efficiently and cost effectively using a particular tubular reactor utilizing reactants in solution under certain conditions.

A first aspect of the invention is a method of forming a precipitated transition metal salt useful to make a lithium metal oxide comprising:
(a) providing (i) a transition metal solution comprised of a dissolved transition metal salt in water, and (ii) an alkali solution comprised of an alkali salt dissolved in water,
(b) providing a reactor having an inlet and an outlet connected by a tubular member having therein packing,
(c) introducing the transition metal solution and alkali solution into the inlet of the plug flow reactor each at a rate to realize a pH (5-12) within the plug flow reactor and a reaction time sufficient to form a precipitated transition metal salt in an effluent liquid;
(d) discharging the precipitated metal salt in the effluent liquid from the outlet of the reactor; and
(e) separating the precipitated metal salt from the effluent. Typically, the type of reactor has been described as a plug flow reactor (PFR), continuous tubular reactor (CTR), piston flow reactors or the like.

A second aspect of the invention is a method of forming a lithium metal oxide comprising,
(a) mixing the precipitated transition metal salt of the first aspect with a source of lithium to form a mixture; and
(b) heating the mixture to a temperature and time sufficient to form the lithium metal oxide.

It has been surprisingly discovered that when using the method of the first aspect, a precursor having desirable primary particle and secondary particle size, size distribution and morphology may be made in seconds or minutes compared to several hours by methods employing stirred tank reactors. Likewise, the method allows for much greater control of the size, size distributions and morphology of the LMO precursor, while attaining cathode materials having at least as good of a performance.

DETAILED DESCRIPTION OF THE INVENTION

Figure 1:
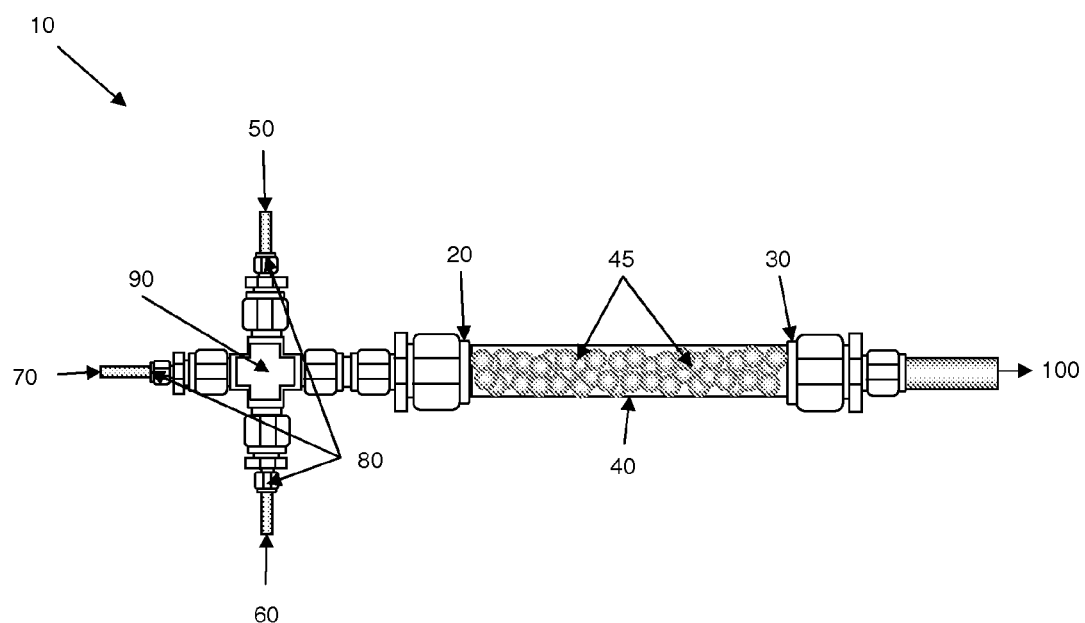
FIG. 1 is an illustration of the tubular reactor employed in the method of this invention.

In practicing the method, an aqueous solution of a transition metal salt is used. This transition metal solution is comprised of any transition metal useful to make a lithium metal oxide suitable for use as a cathode in a lithium ion battery. Preferably, the transition metal is one that can exist in a +2 or +3 oxidation state. Examples of suitable transition metals include V, Cr, Fe, Mn, Ni, Co or combination thereof. Desirable transition metals include Ni, Mn, Co or combinations thereof. In another embodiment, the transition metal solution may include a transition metal able to take the aforementioned oxidation states and a transition metal that has fixed oxidation or does not take either +2 or +3 oxidation state, examples of such transition metals include Zr and Y.

The solution may also contain other metals that may be useful for making lithium metal oxide cathodes such as dopant metals, including for example, Al, Mg, Ca, In, Ga, Ge, Si, or a combination thereof. The rare earth metals, herein, are not considered as transition metals. It is also contemplated that more than one transition metal solution or solution containing a metal other than a transition metal may be added separately. As an illustration, it may be desirable to have more than one metal solution to realize the desired chemical stoichiometry of the precipitated metal salt to be formed. In an embodiment, it is desired that the transition metal solution is comprised of at least 2, 3 or 4 metals including at least one transition metal to any practicable amount such as 10 metals including 10 transition metals.

The transition metal salt may be any suitable salt such as those known in the art that are soluble at least to some extent in water. Suitable metal salts include, for example, sulfates, chlorides, nitrates, fluorides or a combination thereof. Preferably, the salt is a sulfate.

The concentration of the metal solution may be any one that is useful to make the precipitated metal salt. Typically, the total molar concentration of the metal or metals in the transition metal solution is at least about 0.1 M to about 10 M.

In addition to the transition metal solution, the method requires an alkali solution comprised of an alkali salt dissolved in water. The alkali may be any alkali, but is desirably sodium or potassium. Desirably, the alkali salt is an alkali carbonate, alkali hydroxide, alkali oxalate, or a combination thereof. Preferably, the alkali salt is an alkali hydroxide, carbonate or a combination thereof. In an embodiment, the alkali solution or other separate solution is provided containing ammonium ions. In a surprising discovery, however, the method of this invention may be performed in the absence of ammonium, which generally has been found to be necessary in stirred tank reactors to act as a chelating agent to realize the desired primary and secondary particle size and distributions described below. This is highly desirable, because one avoids the problem of disposing of the ammonium in the method of the present invention.

The concentration of the alkali solution may be any one that is useful to make the precipitated metal salt. Typically, the total molar concentration of the alkali in the alkali solution is at least about 0.1 M to about 20 M.

In the practice of the method of the invention to make the precipitated transition metal salt, a reactor 10 is used. The reactor has an inlet 20 and outlet 30 connected by a tubular member 40 having packing 45 therein. The tubular member 40 is depicted as being transparent, but may be opaque depending on its material of construction described below.

The transition metal solution 50 (not shown), alkali solution 60 (not shown) and any optional liquid 70 such as water (not shown) may be introduced into the reactor inlet directly, but preferably are introduced and converged prior to entering into the inlet 20 through premixing inlets 80, of premixing chamber 90. The packing 45 may be retained in the tubular member 40 by any suitable structure such as screen or the like. When converging the solutions prior to entering the tubular member 40 through the inlet 20, the amount of time prior to entering the inlet 20, should be a time where little or no transition metal precipitates are formed prior to entering the tubular member 40 of the reactor 10. Typically, this time prior to entering the inlet 20 of the converged solutions is desirably in a matter of a minute or less to even a fraction of a second.

The optional fluid 70 may include a portion of the effluent liquid 100, for example, as a recycled carrier liquid. It is preferred that at least 50% of the effluent liquid is recycled in the method.

The tubular member 40 and other structures used to construct the reactor may be made of any suitable material useful to handle the solutions and reaction conditions employed in the reactor 10. Typically, the reactor's materials of construction may be a metal, ceramic including glass, plastic or combinations thereof.

The tubular member 40 may be any length or cross-sectional shape (cross-sectional shape perpendicular to the longitudinal axis). The longitudinal axis is the axis extending from the inlet 20 to the outlet 30 of the tubular member. Examples of cross-sectional shapes include round, oval, triangular, quadrilateral, square, pentagonal, hexagonal, octagonal and the like.

Multiple reactors 10 may be placed in parallel or in series. When placed in parallel, the reactors may share the same solutions or use differing solutions with corresponding flows of the solution rates being the same or different and subsequently the effluent 100 may be mixed after being reacted. Such a shared solution input configuration may be desirable, for example, to make differing particle distributions (e.g., bi-modal distributions) of a precipitated transition metal salt having the same chemical composition. In another parallel embodiment, not sharing the same solutions introduced may be advantageous to make two or more precipitated transition metal salts of differing chemical compositions. "Differing" herein, means a statistically significant difference at 90% confidence.

A series configuration of reactors may be useful, for example, to make a precipitated transition metal salt having a gradient structure. For example, differing solution may be introduced into a subsequent reactor creating a shell upon the precipitated transition metal salt made in the prior reactor.

The packing 45 may be any useful material or structure that causes the transition metal solution, alkali solution and any liquid or solution introduced into the inlet 20 of the reactor 45 to essentially have plug flow through the reactor. "Plug flow" is when the velocity of the fluid is essentially constant across any cross-section of the tubular member perpendicular to the longitudinal axis (axis extending from the inlet 20 to the outlet 30) of the tubular member 40.

Typically, the packing 45 may be a bead of any useful shape, a monolithic or segmented inline static mixture structure, or a screw structure. When the packing 45 is a bead the bead may be any useful shape, such as sphere, spheroid, cone, cylinder having any cross-sectional shape, tube, cube or fibrous. In an embodiment, the beads may be monosized (same volume or equivalent spherical diameter, if not spheres) or of varying sizes including bimodal, trimodal or of a continuous size distribution (e.g., Gaussian size distribution within the bead sizes is useful as described in the next paragraph). Generally, the beads are spheres or spheroids, where the size distribution is either monosized or bimodal.

The size of the beads may be any useful size, but generally need to be of a size that creates void channels of sufficient size such that the precipitated transition metal salt product can easily pass through the packing 45. Typically, this means that the packing 45 has a channel size that is on the order of at least 5 times the diameter of any precipitated transition metal particle desired to be made. Generally, the bead size ranges from about 1 mm to about 25 mm, with bead sizes preferably being from about 2 to 20 or 3 to 10 mm in diameter.

The packing 45, generally creates a void fraction of about 20% to 60% within the tubular member 40. Typically, the void fraction is 25% or 30% to 55% to 50%.

The packing 45 may be made of any suitable material useful to handle the solutions and reaction conditions employed. The beads may be wettable or non-wettable by the solutions employed. "Wettable" means the contact angle of the overall solution has a contact angle less than or equal to 90° on the packing material. Suitable bead materials include, for example, ceramics (e.g., crystalline oxides, nitrides, carbides, and amorphous silicates, aluminates, borates and combinations thereof), plastics (e.g., polyolefins, fluoropolymers, polycarbonates, polyesters and combinations thereof), metals (e.g., transition metals and alloys thereof) or combinations of any of the aforementioned. Particular examples include polyethylene, polypropylene, polytetrafluoroethylene, nylon, borosilicate glass, silica glass, soda-lime glass, alumina, stainless steel, nickel alloy or combinations thereof.

The reactor 10 may include a temperature controlling jacket, which is not pictured. Typically, this may involve channels in the wall of the tubular member 40 that allows for cooling or heating liquid to pass through and transfer heat into or out of the reactor or it may be any known heating or cooling methods known in the art such as heating tape or tubes merely wrapped around the tubular member to control the temperature of the reaction.

The reaction conditions used to make the precipitated transition metal contained in the effluent liquid 100, surprisingly may be carried out at reaction times of about 5 seconds to 10 minutes and still realize the desired primary and second particle size of the precipitated transition metal salt described below and electrochemical performance. Typically, the reaction time is on the order of 10 seconds to about 10, 5, or even 2 minutes. The reaction time may be determined by calculating the residence time within the tubular member 40 of the reactor 10 based upon the flow rates of the solution, void fraction, tubular member 40 diameter and length using well known chemical engineering principles. It is understood herein that the reaction time correlates with the residence time within the reactor as calculated by first principles in chemical engineering.

It has been found that to realize the desired precipitated transition metal salt, the overall pH of the solutions introduced into the reactor 10, needs to range from about 5 to 12. Desirably, the pH is about 7 to about 11. The temperature may be any useful temperature, but in general, should be a temperature that is above the freezing temperature and below the boiling temperature of the overall solution (resultant solution from converging the solutions). Typically, the temperature is from about 10° to 90° C. Surprisingly, the temperature may be at ambient temperature or typical room temperatures such as 20° to 30° C. in contrast to the elevated temperatures almost invariably required by stirred tank reactors.

To reiterate, the method of the invention surprisingly allows the rapid formation of precipitated transition metal salts useful to make transition metal oxides used to make lithium ion batteries. The precipitated salts particularly useful to make cathodes, typically, have a primary particle size from about 0.01 micrometer to 2 micrometers. "Primary particle" means the smallest distinct division of a given phase as is readily determined by microscopy and is analogous, for example, to a grain in a fully dense ceramic. The D50 primary particle size is desirably at least 0.02, 0.1 or 0.3 to 2, 1, or 0.75 micrometers. The particle size distribution is given by D10 and D90 particles sizes. Since, the primary particle size is rather small and agglomerated into secondary particles, the size is typically determined by standard microscopic techniques to do so, including, for example, line intercept methods.

"Secondary particle size" means a cluster of primary particles bonded together either by hard or soft bonding where hard bonding is by chemical bonds such as covalent or ionic bonding and soft bonding is by hydrogen, van der Waals or mechanical interlocking. Generally, the D50 secondary particle size by number is 1 to 50 micrometers. Desirably, the secondary particle size D50 is 3 to 20, 15 or 12 micrometers. The secondary particles typically have a D10 that is at least about 0.5, 2, or 5 micrometers and a D90 that is at least about 7, 25, or 40 micrometers. Generally, the secondary particle size may be measured by known techniques for measuring particles greater than 1 micrometer and may include, for example, sieving, light scattering methods and microscopic methods.

In a particular embodiment, it is desirable for the precipitated transition metal salt and the lithium transition metal oxide made therefrom to have a bimodal secondary particle size distribution. It is understood that any particle size detailed herein for the precipitated transition metal salt is applicable to the lithium transition metal oxide made therefrom. It is preferred that this bimodal size distribution is comprised of a distribution having a D50 size of 2 to 10 micrometers and the other size distribution having a D50 of greater than 10 micrometers. It is also preferred that the larger size distribution is from 65% to 90% by volume of the total volume of the particles in the distribution.

After the precipitated transition metal salt has been formed in the reactor, it is discharged within the effluent liquid and separated from the effluent liquid. The separation of the precipitated transition metal salt from the effluent liquid may be done by any suitable method such as those known in the art. Examples include, settling, centrifuging, filtering, drying or combination thereof. After separation or as part of the separation, it is desirable to remove any contaminants (elements or compounds not desired in the precipitated transition metal salt). The contaminants may be removed, for example, by washing with water.

In making a lithium metal oxide from the precipitated transition metal salt, said salt is typically dried by any suitable method. Examples of drying include heating, applying vacuum, air drying, freeze drying, or any combination thereof. If drying by heating, the temperature is typically less than the temperature where the salt decomposes to the oxide. Generally, the temperature of drying is greater than 80° C. to about 250° C.

When making a lithium metal oxide, the precipitated transition metal salt is typically mixed with a source of lithium if it is not already present in the precipitated salt in an amount desired in the lithium metal oxide. The mixing may be performed in a liquid or dry. Typically, dry mixing is more than sufficient. The mixture is then heated to a temperature and time sufficient to make the lithium metal oxide. Generally, the temperature is from about 500° C. to 1200° C. Preferably, the temperature is from 600° C. to 1000° C. The time may be any practicable, but typically is from several minutes to 48 hours. The atmosphere typically should be comprised of oxygen, with air or dry air being suitable.

Prior to heating to form the LMO, if a lithium source is not present in the precipitated transition metal salt or is not present in an amount sufficient to form the desired LMO upon heating, the lithium source may be added at any convenient time to the precipitated transition metal salt. Typically, the lithium source may be added as needed after precipitated transition metal salt has been dried. The lithium source may be any suitable lithium source such as those known in the art and include, for example, a lithium salt such as lithium carbonate, lithium hydroxide, lithium nitrate, or combinations thereof.

EXAMPLES

Analytical Methods

Particle Size Analysis:

The particle size was analyzed using a Microtrac 53500 particle size analyzer (Microtrac Inc., Largo, Fla.). Around 0.2 g of precipitated and dried transition metal salt powders were mixed together with around 10 ml of DI water. The mixture was shaken for several seconds. The mixture was further ultra-sonicated for 1 to 2 minutes before the particle size analysis was performed.

Tap Density Analysis:

The tap density of the dried precipitated transition metal salt powders was performed using a Tap-2S tap density tester (Logan Instruments, NJ). The tapping height was set at 3 mm, and the powder was tapped 3,000 times at a tapping frequency of 300 taps/minute.

Example 1

A transition metal solution was made by dissolving individual cobalt sulfate (battery grade, Huayi Chemical Co. Ltd., Zhangjiagang, Jiangsu, China), nickel sulfate (battery grade, Huayi Chemical Co. Ltd., Zhangjiagang, Jiangsu, China) and manganese sulfate (battery grade, Maya Chemical Company, Taipei, Taiwan, China) in an amount to form a 2M (total transition metal concentration) aqueous solution in the metal ratio $Ni_{0.2125}Mn_{0.7}Co_{0.0875}$. An aqueous alkali solution was formed having 2M of $Na_2CO_3$ (Reagent grade, Fisher Scientific, Texas) and 0.4M of $NH_4OH$ (28.0-30.0 w/w %, Fisher Scientific, TX).

The reactor used was configured as in FIG. 1. The reactor was a stainless steel tube 12 inches in length with an outer diameter of ¾ of an inch and a wall thickness of 0.065". The packing was 3 mm spherical borosilicate beads available from Sigma Aldrich (Catalog No.: Z143928). The beads were packed to a void ratio of 40%. The transition metal solution, alkali solution and optional deionized (DI) water were separately introduced into the premixing chamber at flow rates shown in Table 1. The flow rates resulted in a reaction time as shown in Table 1 and a pH also shown in Table 1.

The precipitated transition metal salt in the effluent liquid was discharged from the reactor, where the precipitated salt was separate from the effluent by filtration. The precipitated salt was washed by vacuum filtration with DI water to remove contaminants and then dried at 110° C. under air in convection oven. The precipitated transition metal salt had a composition of $Ni_{0.2125}Mn_{0.7}Co_{0.0875}CO_3$. The precipitated salt had a generally unimodal spherical shape and size distribution having a D10, D50 (median) and D90 secondary particle size shown in Table 1.

Examples 2-8

Each of the precipitated salts in these Examples had the same chemical composition and was made using the same method and reactor as Example 1, except for the concentrations of the solutions and their flow rates being varied as shown in Table 1.

Lithium metal oxides were made from the precipitated salts of Examples 6 and 7 as follows. The rinsed and dried precipitate salts were mixed with $Li_2CO_3$ (battery grade, SQM, Atlanta, Ga.) at a molar ratio of Li/transition metals=1.4. The mixture was then heated in air to 850° C. and held for 10 hours to form the lithium metal oxide.

To test for electrochemical performance of the lithium metal oxides made from the precipitated salts of Examples 6 and 7, the lithium metal oxides (LMO) were mixed with SUPER P™ carbon black (Timcal Americas Inc. Westlake, Ohio), VGCF™ vapor grown carbon fiber (Showa Denko K.K. Japan) and polyvinylidene fluoride (PVdF) (Arkema inc., King of Prussia, Pa.) binder in a weight ratio of LMO:SuperP:VGCF:PVdF of 90:2.5:2.5:5. A slurry was prepared by suspending the cathode material, conducting material, and binder in solvent N-Methyl-2-pyrrolidone (NMP) followed by homogenization in a vacuum speed mixer (Thinky USA, Laguna Hills, Calif.). The NMP to solids ratio was approximately 1.6:1 before defoaming under mild vacuum. The slurry was coated on to battery grade aluminum foil using a doctor blade to an approximate thickness of 30 micrometers and dried for thirty minutes at 130° C. in a dry convection oven. The aluminum foil was 15 micrometers thick. 2025 type coin cells were made in a dry environment (dew point less than or equal to −40° C.).

The electrodes were pressed on a roller press to approximately 17 micrometers resulting in an active material density of about 2.7 to about 3.0 g/cc. The cells had a measured loading level of about 5 mg/cm². The electrolyte was ethylene carbonate/diethyl carbonate (EC:DEC, 1:9 by volume) with 1.2 M $LiPF_6$. The anode was a 200 micrometers thick, high purity, lithium foil available from Chemetall Foote Corporation, New Providence, N.J. The separator was a commercially available coated separator.

The cells were cycled on a MACCOR Series 4000 battery testing station (MACCOR, Tulsa, Okla.). Cells were activated by charging at C/20 to 4.6 V followed by a 30 minute constant voltage hold (1C=250 mAh/g current density). Cycling was performed between 4.6 volts and 2 volts using C/3 charge and 1C discharge rates. Prior to cycling in the aforementioned manner, the cells were first cycled to determine the initial capacity of the battery at a C rate of 0.05 and then the capacity was also determined, in order thereafter at C rates of 0.1, 0.33, 1, 3, 5.

Comparative Example 1

A precipitated transition metal salt with the same composition as the Examples was made using a stirred tank reactor as follows. A transition metal solution was made by dissolving individual cobalt sulfate, nickel sulfate and manganese sulfate in an amount to form a 2M (total transition metal concentration) aqueous solution in the metal ratio $Ni_{0.2125}Mn_{0.7}Co_{0.0875}$. An aqueous alkali solution was formed having 2M of $Na_2CO_3$ and 0.4M of $NH_4OH$.

The two solutions were pumped into a 2 liter (L) size, continuously stirred, tank reactor which was prefilled with 2 L DI water. The tank reactor had an overflow opening at the upper part which allowed the precipitated transition metal salts to effuse out of the reactor. Both the overflowed precipitates and the precipitates remaining inside the reactor were collected at the end of the reaction. The tank reactor was continuously stirred at 1,000 rpm by an overhead stirring system. The temperature inside the reactor was controlled at 60° C. by water bath. The pH value during the reaction process was controlled at 8.0±0.1. The flow rate of both solutions was 1.0 L/hr (16.6 ml/min). The co-precipitation reaction was stopped after 2 hours of reaction time. The particle size and tap density of the precipitated $Ni_{0.2125}Mn_{0.7}Co_{0.0875}CO_3$ are shown in Table 1.

Likewise, the precipitated transition metal salt was mixed with the $Li_2CO_3$ in the same proportion as in Examples 6 and 7 and calcined in the same manner to form a lithium metal oxide. The lithium metal oxide was made into button cells in the same manner as for Examples 6 and 7.

Figure 2:
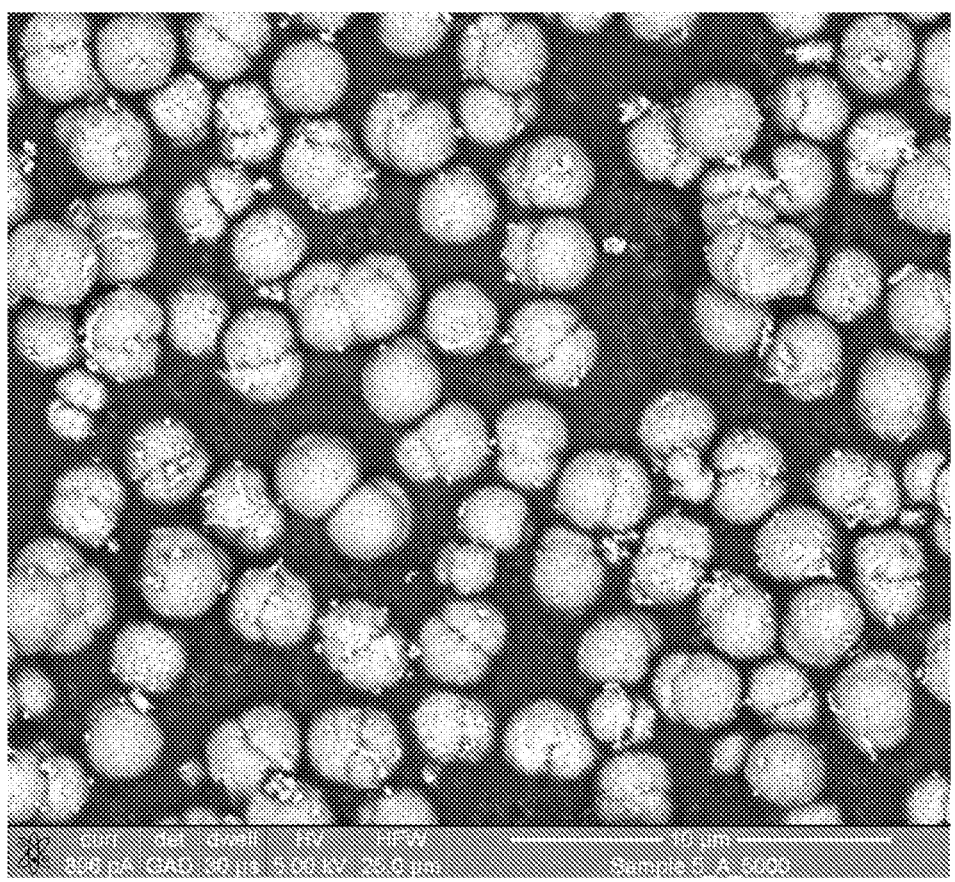
FIG. 2 is a 5000× magnification scanning electron micrograph (SEM) of the dried precipitated transition metal salt of Example 1.
Figure 3:
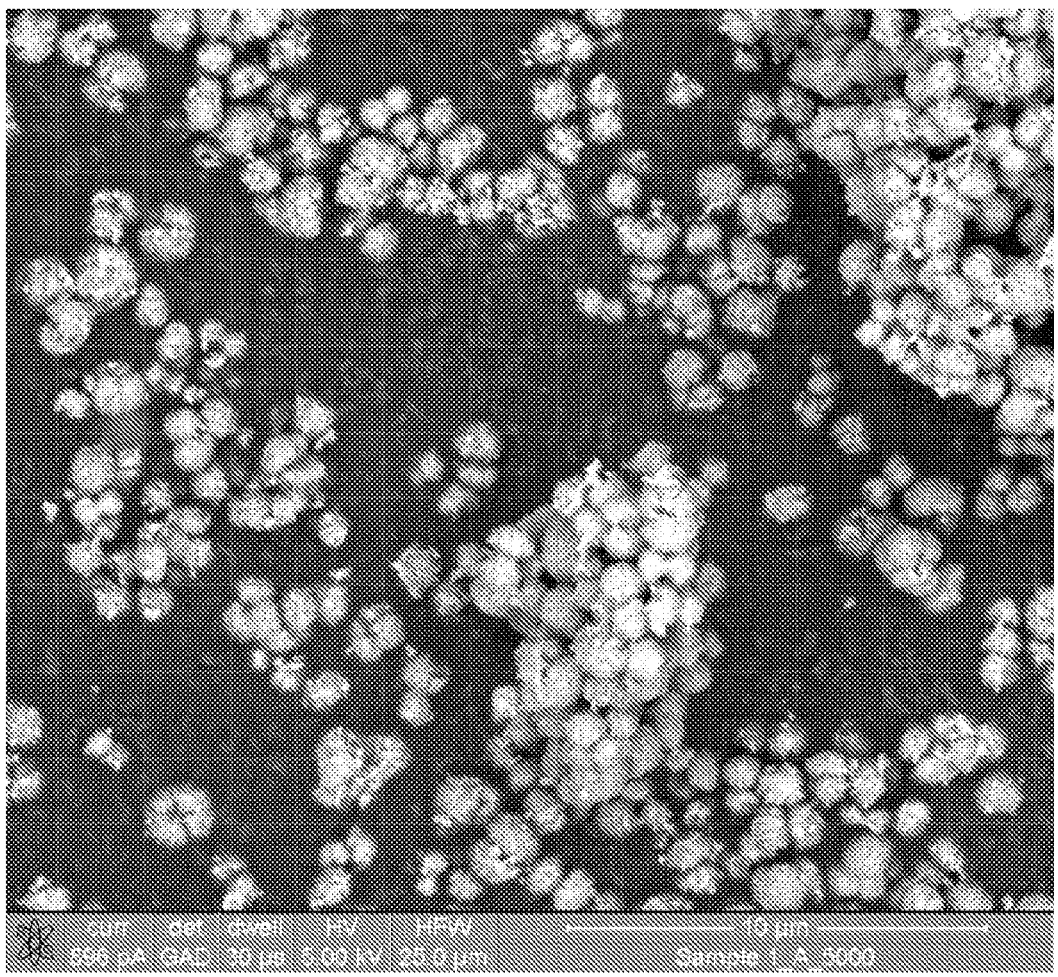
FIG. 3 is a 5000× magnification scanning electron micrograph (SEM) of the dried precipitated transition metal salt of Example 6.
Figure 4:
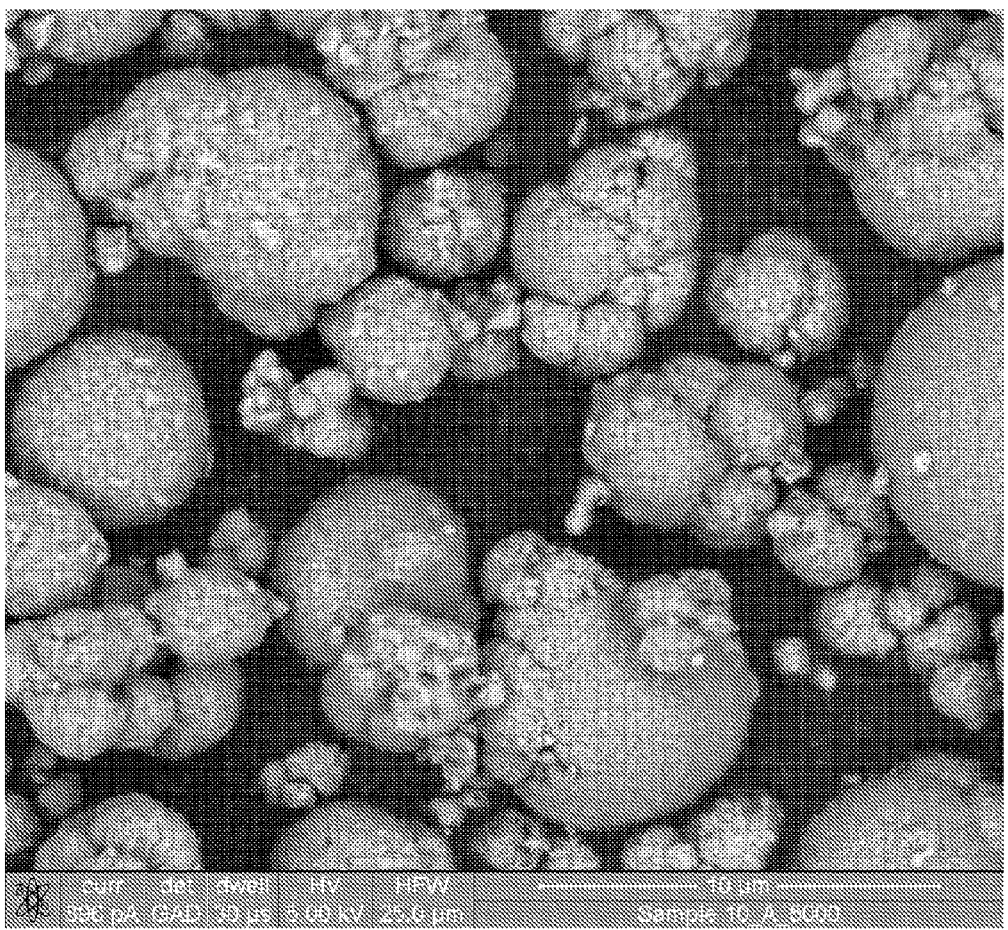
FIG. 4 is a 5000× magnification scanning electron micrograph (SEM) of the dried precipitated transition metal salt of Comparative Example 1.
Figure 5:
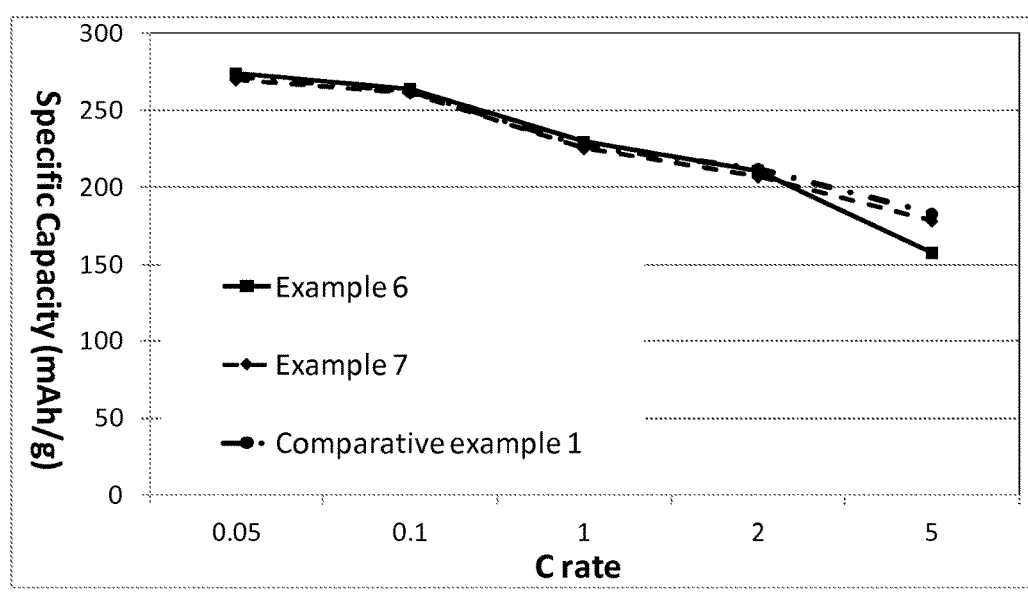
FIG. 5 is a graph of the specific capacity performance at differing discharge rates (C rates) of a battery made using lithium metal oxides of this invention and a battery made using a lithium metal oxide not of this invention.
Figure 6:
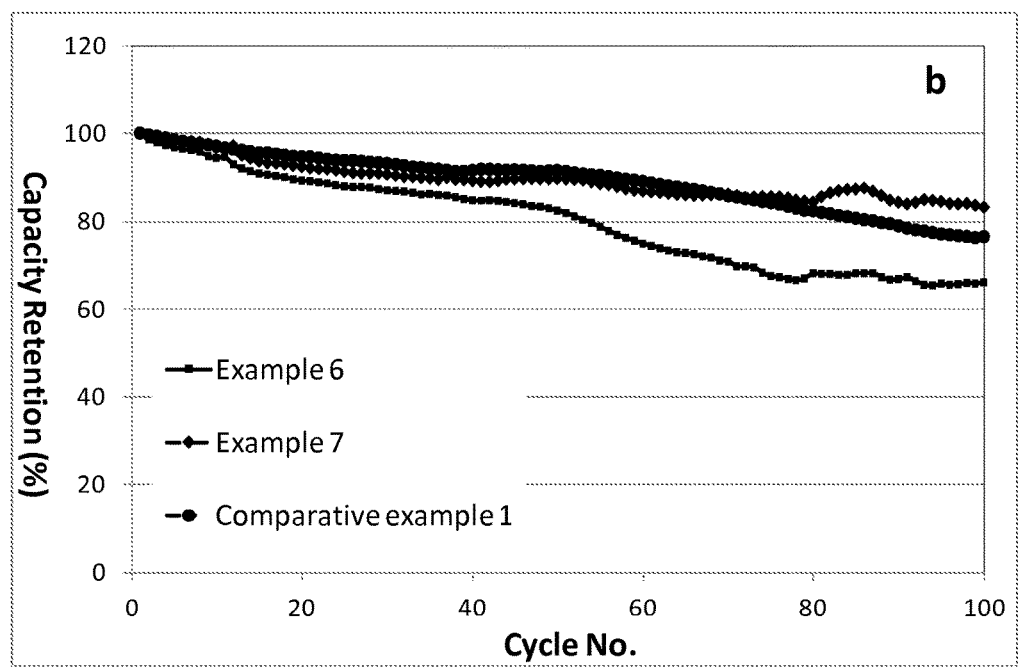
FIG. 6 is a graph of the capacity retention vs. cycle No. at 1C (1C=250 mAh/g current density) discharge rate of a battery made using lithium metal oxides of this invention and a battery made using a lithium metal oxide not of this invention.

From the data in Table 1 and the Figures, it is apparent that the method of this invention is able to make transition metal salts useful to make lithium metal oxides at least comparable to the typical known stirred tank reactor methods (see FIGS. 2-4). It is also apparent that the transition metal salts may be made in a fraction of the reaction time of the stirred tank reactors while still achieving as good or better electrochemical performance as shown in FIGS. 5 and 6.

(b) providing a plug flow reactor having an inlet and an outlet connected by a tubular member having therein packing, (c) introducing the transition metal solution and the alkali solution into the inlet of the plug flow reactor each at a rate to realize a pH of 5 to 12 within the plug flow reactor and a reaction time sufficient to form a precipitated transition metal salt in an effluent liquid, wherein the alkali solution, the transition metal solution are separately pumped into a premixing chamber that is in direct communication with inlet of the plug flow reactor such that said transition metal solution, and alkali solution are contacted with each other prior to introducing into the plug flow reactor, (d) discharging the precipitated transition metal salt in the effluent liquid from the outlet of the reactor; and (e) separating the precipitated transition metal salt from the effluent.

2. The method of claim 1, wherein the transition metal solution is comprised of at least two transition metals dissolved therein.

3. The method of claim 1, wherein the transition metal solution is comprised of at least three transition metals dissolved therein.

4. The method of claim 1, wherein the transition metal salts are a sulfate, chlorite, nitrate, fluorite or combination thereof.

5. The method of claim 1, wherein the method is performed in the absence of ammonium.

6. The method of claim 1, wherein the plug flow reactor is comprised of at least two plug flow reactors interconnected in parallel in which the alkali solution and transition metal solution are separately introduced into the inlet of each said plug flow reactors such that the effluent are combined to make a combined precipitated transition metal salt and the precipitated transition metal salt from each said plug flow reactor has at least one characteristic dissimilar to the precipitated transition metal salt from each of the other plug flow reactors.

7. The method of claim 6, wherein the combined precipitated transition metal salt has a bimodal size distribution.

TABLE 1

| Ex. | Conc. Trans. Metal Soln. (M) | Conc. Alkali Solution ($Na_2CO_3$/ $NH_2OH$) (M) | Tran. Metal Soln. Flow Rate (ml/min) | Alkali Soln. Flow Rate (ml/min) | DI Water Flow Rate (ml/min) | Reactor Soln. (pH) | React. Time (sec) | D10 Part. Size (μ) | Median D50 Part. Size (μ) | D90 Part. Size (μ) | Tap Density (g/cc) |
|---|---|---|---|---|---|---|---|---|---|---|---|
| 1 | 2 | 2/0.4 | 16.6 | 16.6 | 266.8 | 8.0 | 60 | 1.62 | 4.12 | 9.23 | 1.20 |
| 2 | 3 | 2/0.4 | 33 | 33 | 234 | 7.8 | 60 | 0.85 | 3.67 | 7.18 | 1.06 |
| 3 | 3 | 2/0.4 | 33 | 33 | 534 | 7.6 | 60 | 3.16 | 7.68 | 16.18 | 1.21 |
| 4 | 1 | 2/0.4 | 16.6 | 16.6 | 566.8 | 8.2 | 60 | 3.03 | 7.33 | 29.49 | 1.25 |
| 5 | 1 | 2/0.4 | 16.6 | 16.6 | 266.8 | 8.3 | 60 | 5.45 | 12.32 | 37.60 | 1.20 |
| 6 | 2 | 2/0.4 | 33 | 33 | 233 | 8.0 | 60 | 0.88 | 4.03 | 25.60 | 0.85 |
| 7 | 3 | 2/0.4 | 16.6 | 25 | 258 | 8.0 | 60 | 3.27 | 11.93 | 27.71 | 1.11 |
| 8 | 2 | 2/0 | 16.6 | 16.6 | 266.8 | 8.0 | 60 | 4.73 | 8.49 | 17.23 | 1.20 |
| Comp 1 | 2 | 2/0.4 | 16.6 | 16.6 | 0 | 8.0 | 7200 | 2.79 | 6.02 | 12.86 | 1.20 |

The invention claimed is:

1. A method of forming a precipitated transition metal salt useful to make a lithium transition metal oxide useful for making a lithium ion battery comprising:

(a) providing (i) a transition metal solution comprised of a dissolved transition metal salt in water, and (ii) an alkali solution comprised of an alkali salt dissolved in water, 8. The method of claim 1, wherein water is separately pumped into the premixing chamber.

9. The method of claim 1, wherein the alkali solution has a total salt concentration of from 0.1 to 20 M.

10. The method of claim 1 wherein the precipitation is carried out a temperature from 10° C. to 90° C.

11. The method of claim 1, wherein the reaction time is from 5 seconds to 10 minutes.

12. The method of claim 1, wherein the precipitated transition metal salt has a secondary particle size distribution that is bi-modal.

13. A method of forming a lithium metal oxide comprising,
(a) mixing the precipitated transition metal salt of claim 1 with a source of lithium to form a mixture; and
(b) heating the mixture to a temperature and time sufficient to form the lithium metal oxide.

14. The method of claim 1, wherein the effluent is recycled by introducing the effluent into the plug flow reactor in step (c).

15. A method of forming a precipitated transition metal salt useful to make a lithium transition metal oxide useful for making a lithium ion battery comprising:
(a) providing (i) a transition metal solution comprised of a dissolved transition metal salt in water, and (ii) an alkali solution comprised of an alkali salt dissolved in water,
(b) providing a plug flow reactor having an inlet and an outlet connected by a tubular member having therein packing,
(c) introducing the transition metal solution and the alkali solution into the inlet of the plug flow reactor each at a rate to realize a pH of 5 to 12 within the plug flow reactor and a reaction time sufficient to form a precipitated transition metal salt in an effluent liquid, wherein the plug flow reactor is comprised of two or more plug flow reactors interconnected in series, parallel or a combination thereof,
(d) discharging the precipitated transition metal salt in the effluent liquid from the outlet of the reactor, and
(e) separating the precipitated transition metal salt from the effluent.

16. A method of forming a precipitated transition metal salt useful to make a lithium transition metal oxide useful for making a lithium ion battery comprising:
(a) providing (i) a transition metal solution comprised of a dissolved transition metal salt in water, and (ii) an alkali solution comprised of an alkali salt dissolved in water,
(b) providing a plug flow reactor having an inlet and an outlet connected by a tubular member having therein packing,
(c) introducing the transition metal solution and the alkali solution into the inlet of the plug flow reactor each at a rate to realize a pH of 5 to 12 within the plug flow reactor and a reaction time sufficient to form a precipitated transition metal salt in an effluent liquid, wherein the packing of the plug flow reactor is comprised of beads and the beads have a bimodal distribution,
(d) discharging the precipitated transition metal salt in the effluent liquid from the outlet of the reactor, and
(e) separating the precipitated transition metal salt from the effluent.

17. The method of claim 16, wherein the beads are packed such that the packing results in a void fraction of the plug flow reactor that is 20% to 60%.

* * * * *